(No Model.)
G. A. H. TAYLOR.
MACHINE FOR FORMING AND REEFING FLUTINGS FOR RUCHES.
No. 250,601. Patented Dec. 6, 1881.
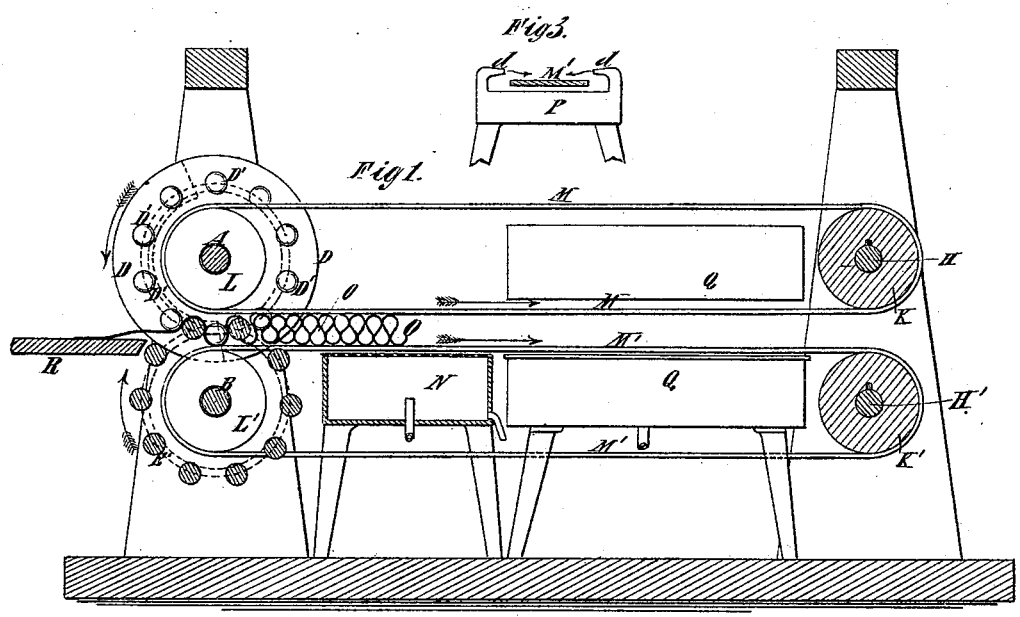
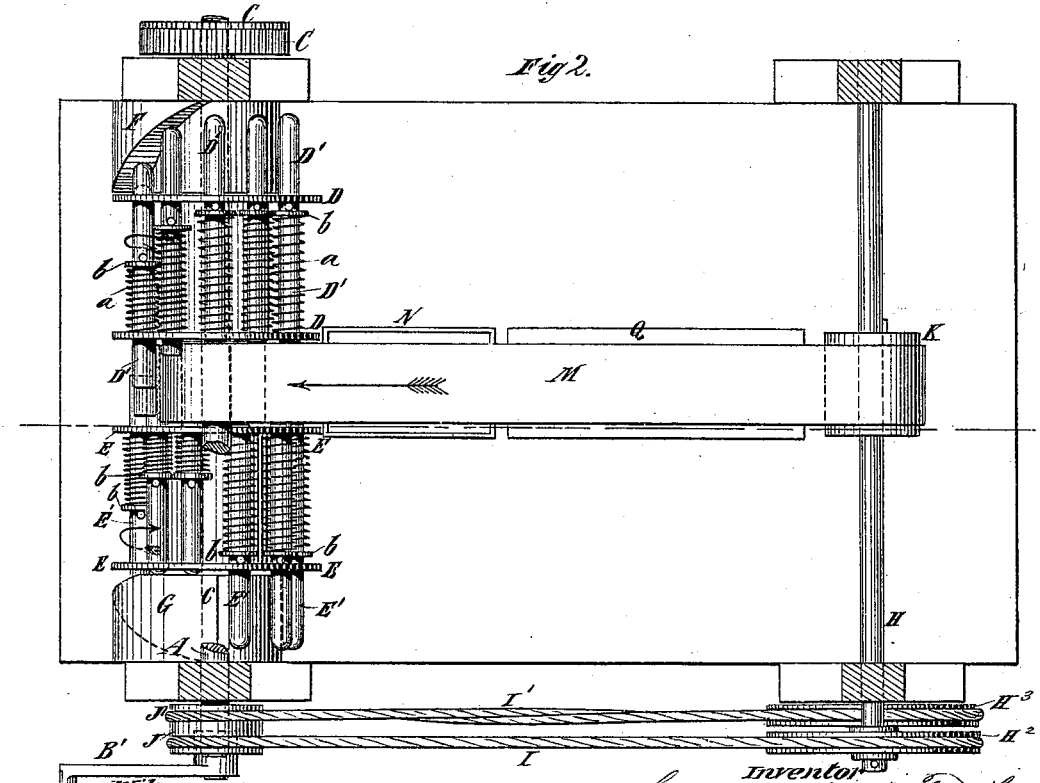

UNITED STATES PATENT OFFICE.

GEORGE A. H. TAYLOR, OF BROOKLYN, NEW YORK.

MACHINE FOR FORMING AND REEFING FLUTINGS FOR RUCHES.

SPECIFICATION forming part of Letters Patent No. 250,601, dated December 6, 1881.

Application filed March 23, 1881. (No model.)

*To all whom it may concern:*

Be it known that I, GEORGE A. H. TAYLOR, of Brooklyn, in the county of Kings and State of New York, have invented certain new and useful Improvements in Machines for Forming and Reefing Flutings for Ruches, &c., of which the following is a specification.

My invention relates to machines in which the fluting is done by rotary wheels having intermeshing teeth or pins, and the reefing or setting by a pair of endless belts, the adjacent portions of which travel in the same direction and at a slower speed than the intermeshing teeth or pins of the fluting-wheels. Ordinarily the fluting in such machines is not done very closely, because the pins or teeth of the fluting-wheels are drawn out of the flutes by a movement transverse to the length of the said pins or teeth; and the principal object of my invention is to enable closer fluting to be done by such intermeshing fluting-wheels.

The invention consists in the combination, in a fluting-machine, of two fluting-wheels having parallel shafts or axes and adapted to rotate continuously in reverse directions, teeth or pins movable longitudinally in said wheels, means for moving said teeth or pins in one direction to cause or enable them to intermesh, and means for moving them in the opposite direction to withdraw them from the ends of the flutes. The means for moving said teeth or pins to cause them to intermesh preferably consist of stationary cams concentric with the shafts upon which the wheels are carried, and the means for withdrawing the teeth or pins longitudinally from the flutes consists of springs, which act as soon as the teeth or pins are released by the cams.

The invention further consists in the combination, with the fluting-wheels, of endless belts or bands for reefing or setting the fluted fabric, as particularly hereinafter described, and in the combination, with endless belts or bands for reefing or setting the fluted fabric, of devices of a novel character for damping the fluted fabric and afterward drying it, all as more fully hereinafter described.

In the accompanying drawings, Figure 1 represents a longitudinal section of a machine embodying my invention. Fig. 2 represents a plan thereof, and Fig. 3 represents a detail view of a steaming or damping box of novel construction for damping the fluted fabric while it is being reefed or set.

Similar letters of reference designate corresponding parts in all the figures.

A B designate, respectively, upper and lower shafts, parallel with each other, and geared together by wheels C, so as to rotate continuously at an equal speed and in reverse directions when motion is imparted through a hand-crank, B', on the shaft B, or by other means. Upon these shafts are secured fluting-wheels, the one on the upper shaft, A, being at one side of the one on the lower shaft, B, a distance rather more than equal to the width of the fluted fabric. The upper fluting-wheel is composed of a hub having flanges D at opposite ends, in which are fitted teeth or pins D', which may be readily moved or slid longitudinally in the holes in the flanges through which they pass, and the lower fluting-wheel is likewise composed of a hub, two flanges, E, and loose pins or teeth E'. The two fluting-wheels are secured fast to the shafts A B, and said shafts are placed at such a distance apart that the two circular series of pins or teeth D' E' will intermesh.

Upon each of the pins or teeth are spiral springs *a*, which bear at one end upon one of the flanges D' E', and at the other upon shoulders formed upon said pins or teeth by securing washers *b* thereto. Thus it will be seen that the natural tendency of the springs *a* is to draw back the several pins or teeth D' E' of each circular series, so that they will not intermesh with the teeth of the other circular series.

Arranged concentrically at the end of the upper shaft, A, is a stationary cam, F, and at the opposite end of the lower shaft, B, and also concentric therewith, is a second stationary cam, G. As the fluting-wheels are rotated their pins or teeth D' E' are gradually advanced toward each other by the inclines on the cams, as shown clearly in the case of the cam F and pins or teeth D' in the drawings, and where the pins or teeth intermesh to form the flutes the pins or teeth of one wheel project past the ends of those of the other wheel about the width of the fluted fabric.

It is obvious that after the pins or teeth of the two fluting-wheels pass a line drawn between the two shafts A B they would ordinarily withdraw transversely from each other. Just at this time, however, the pins or teeth are brought by the rotation of the wheels opposite a let-off or shoulder, c, upon each cam F G, as seen in Fig. 2, and as soon as the pins or teeth reach this shoulder they are immediately released and are impelled longitudinally by the force of the springs a, so as to withdraw them suddenly from the flutes formed by them. Where the fluting-wheels have rigid pins or teeth the flutes must be left open sufficiently to draw the pins or teeth sidewise out of the flutes; but where the pins or teeth are withdrawn endwise from the flutes the pins or teeth may be arranged much nearer together.

H H' designate two shafts, arranged one above the other, and both deriving motion by means of belts I I', passing over pulleys J J' on the shaft A and over larger pulleys H² H³ on the shafts H H', thus driving the shafts H H' at a slower speed than the shafts A B. Upon the shafts H H' are fixed pulleys K K', and upon the shafts A B are loose pulleys L L', arranged one immediately over the other. Over the pulleys K L passes an endless belt or apron, M, and over the pulleys K' L' passes a similar endless belt or apron, M'; and as the belt I' is a cross-belt, it will be seen that the adjacent or middle portions of the two endless belts or aprons will be made to travel in one direction, but at a slower speed than the fluting-wheels upon the shafts A B. The withdrawal longitudinally of the pins or teeth from the fluted fabric makes it possible to bring the belts M M' near to the shafts A B, and, as here shown, the pulleys L L' are arranged concentrically with the fluting-wheels; hence the fluted fabric is carried more directly from the fluting-wheels to the belts or aprons M M', and as they travel at a slower speed than that of the pins or teeth of the fluting-rollers, they retard the fluted fabric and reef it, or bring its flutes nearer together.

In order to insure the proper setting of the fluted fabric it is necessary to dampen the fabric, and then dry it while between the reefing belts or aprons, and the dampening I effect by means of a steam-box, N, provided with suitable inlet and outlet pipes and arranged immediately beneath the portion of the belt, M', which carries the fluted fabric O. The box N may have a perforated top for the escape of steam; and to facilitate the passage of steam to the fabric, the belt M' may be composed of a number of narrow strips or bands, side by side, and connected, if desired, so as to constitute practically a single belt.

In lieu of the form of steam-box N shown in Fig. 1, I may employ a box, P, having a recessed top for the reception of the belt M', and overhanging perforated lips d, which discharge steam directly upon the fluted fabric, as shown in Fig. 3. After being thus dampened, it is necessary to dry the fluted fabric; and this I effect by imperforate steam-boxes Q, placed one above and the other below the portions of the belts M M' which carry the fluted fabric.

The fabric to be fluted is fed over a supporting-table, R, (a portion of which is shown in Fig. 1,) to the fluting-wheels, and issues from between the belts M M' a completed reefed and set fluted fabric.

If desirable, suitable idler-pulleys might be employed to keep the belts M M' taut.

Although the pins or teeth of the fluting-wheels are here shown as cylindrical, they may be of any shape corresponding to the form of flute to be produced.

The steaming and drying boxes might be combined with the reefing-belts in a machine without fluting-rollers, and the fabric previously fluted upon a separate machine be pushed through a guide and between the belts by an attendant as fast as the belt will take the fabric up.

What I claim as my invention, and desire to secure by Letters Patent, is—

1. The combination, in a fluting-machine, of two fluting-wheels, having parallel shafts or axes, and adapted to rotate continuously in reverse directions, teeth or pins movable longitudinally in said wheels, means for moving said teeth or pins in one direction to cause the teeth or pins of the two wheels to intermesh to form flutes, and means for moving said teeth or pins in the opposite direction to withdraw them from the flutes, substantially as specified.

2. The combination, in a fluting-machine, of two fluting-wheels having parallel shafts or axes, and adapted to rotate continuously in reverse directions, teeth or pins movable longitudinally in said wheels, stationary cams concentric with said wheels for moving the said pins or teeth in one direction to cause the pins or teeth of the two wheels to intermesh to form flutes, and springs for moving said pins or teeth in the opposite direction when released by said cams to withdraw them from the flutes, substantially as specified.

3. The combination of the fluting-wheel composed of flanges D and pins or teeth D', the fluting-wheel composed of flanges E and pins or teeth E', the stationary cams F G, and the springs a, all substantially as specified.

4. The combination, in a fluting-machine, of the shafts A B, the rotary fluting-wheels secured to said shafts, and comprising movable teeth or pins D' E', pulleys L L', mounted loosely on said shafts A B, shafts H H', having pulleys K K' fast upon them, and reefing-belts M M', passing around said pulleys L L' K K', all substantially as specified.

5. The combination, in a machine for reefing and setting fluted fabric, of two endless belts, the adjacent portions of which travel in the same direction and carry the fluted fabric between them, a steaming-box arranged below the portion of the belts carrying the fabric, and drying-boxes arranged above and below said portions of the belts for drying after steaming, substantially as specified.

6. The combination, in a machine for reefing and setting fluted fabric, of two endless belts, the adjacent portions of which travel in the same direction and carry the fluted fabric between them, and a steaming-box having a recessed top for the lower belt, and overhanging perforated lips for discharging steam directly upon the fabric, substantially as specified.

GEORGE A. H. TAYLOR.

Witnesses:
FREDK. HAYNES,
ED GLATZMAYER.